United States Patent [19]
Park

[11] 3,711,689
[45] Jan. 16, 1973

[54] PIPELINE MONITORING SYSTEM

[76] Inventor: James E. Park, 20742 Collegewood, Walnut, Calif. 91789

[22] Filed: Aug. 16, 1971

[21] Appl. No.: 171,859

[52] U.S. Cl.................235/151.34, 73/3, 73/40.5 R, 73/196, 137/551
[51] Int. Cl............................G01f 1/04, G06f 15/20
[58] Field of Search........73/3, 40.5 R, 196; 137/551; 235/151.34

[56] References Cited

UNITED STATES PATENTS 3,505,513  4/1970  Fowler et al.....................235/151.34
3,610,898  10/1971  Yamamoto et al..............235/151.34

Primary Examiner—Malcolm A. Morrison
Assistant Examiner—R. Stephen Dildine, Jr.
Attorney—Lyon & Lyon

[57] ABSTRACT

There is disclosed herein an electronic monitoring system for pipelines and the like utilizing counting techniques for determining the difference between fluid volume supplied into a pipeline and the fluid volume removed from the pipeline. An error factor is employed and, based upon the volume difference, provides compensation for normal difference between the input and output volume measuring devices. This error factor then compensates for the normal difference between input and output volume. Abnormal deviations can then be detected to determine fluid leaks and the like for actuating alarm and control circuits for providing an alarm and/or terminating fluid flow in the pipeline system. There is also disclosed herein the manner in which the present electronic system can be utilized for monitoring a pipeline system with multiple input meters or outputs meters. There is also disclosed herein methods for precisely determining the normal difference between input and output meters.

18 Claims, 12 Drawing Figures

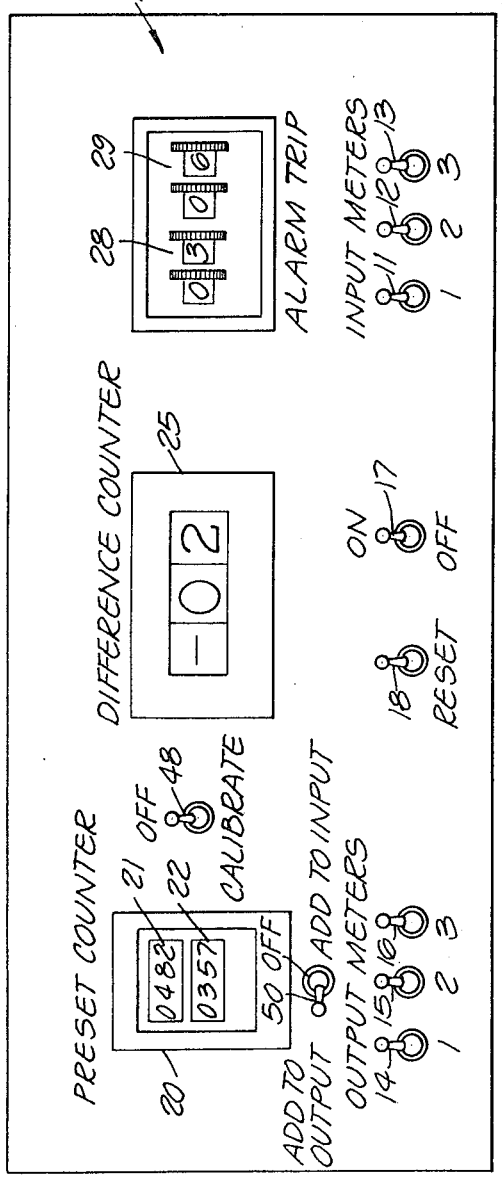
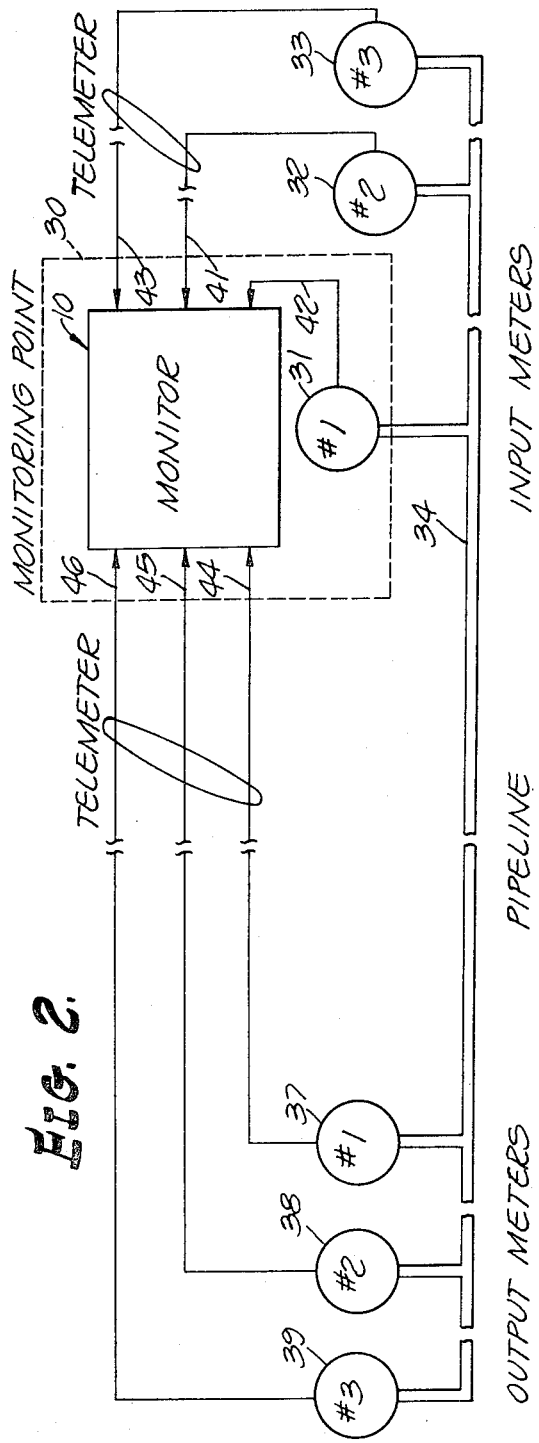

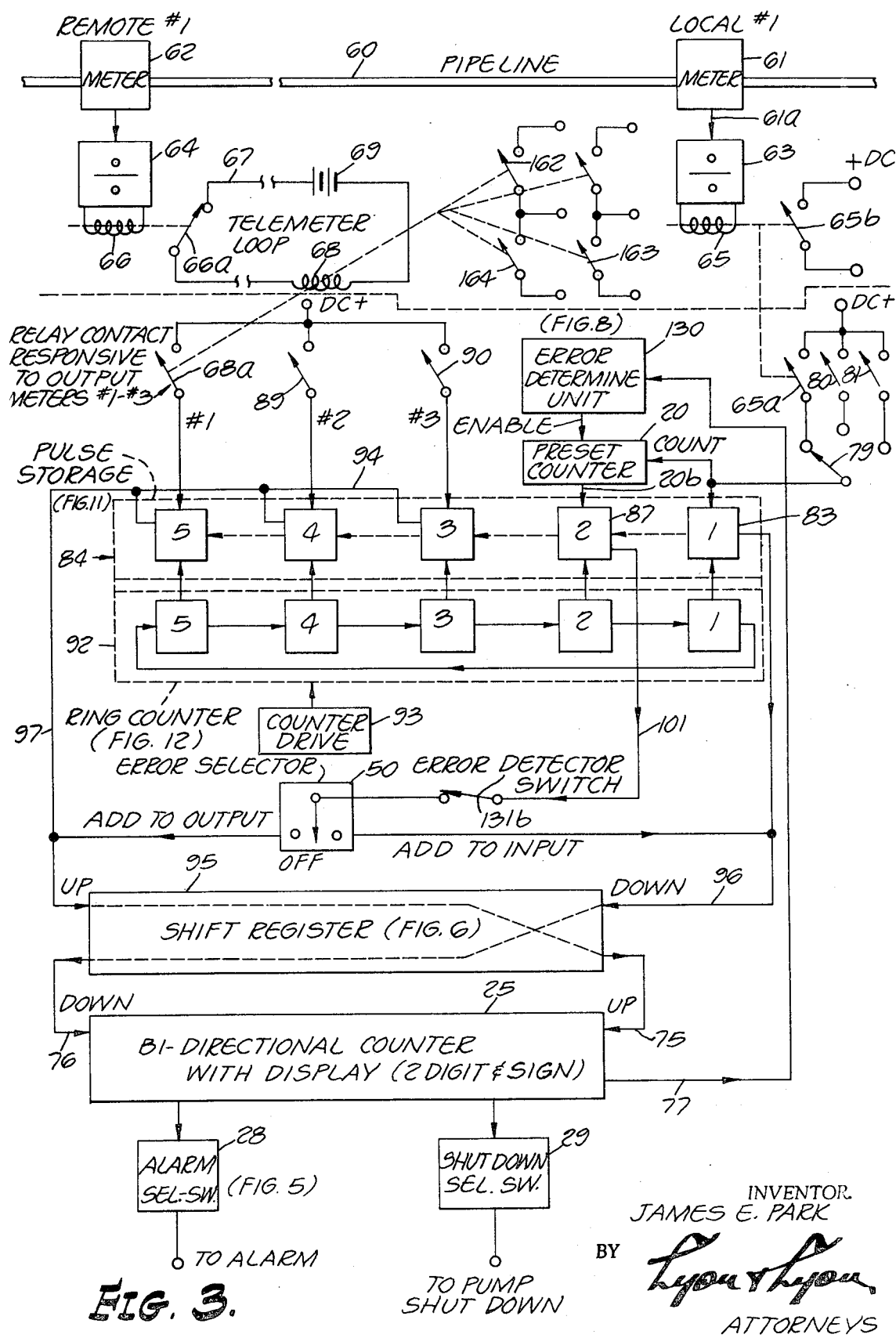

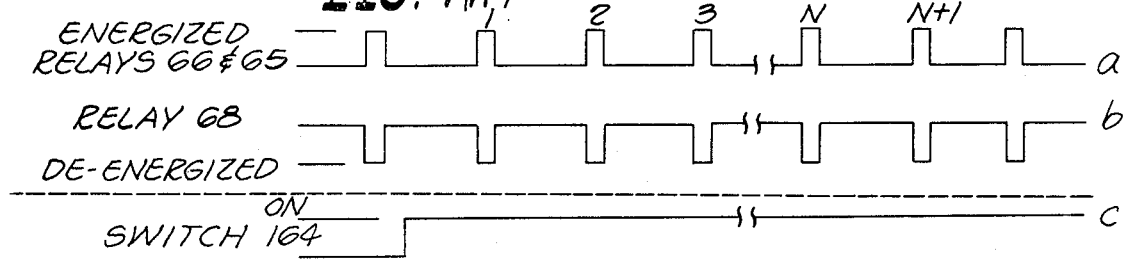
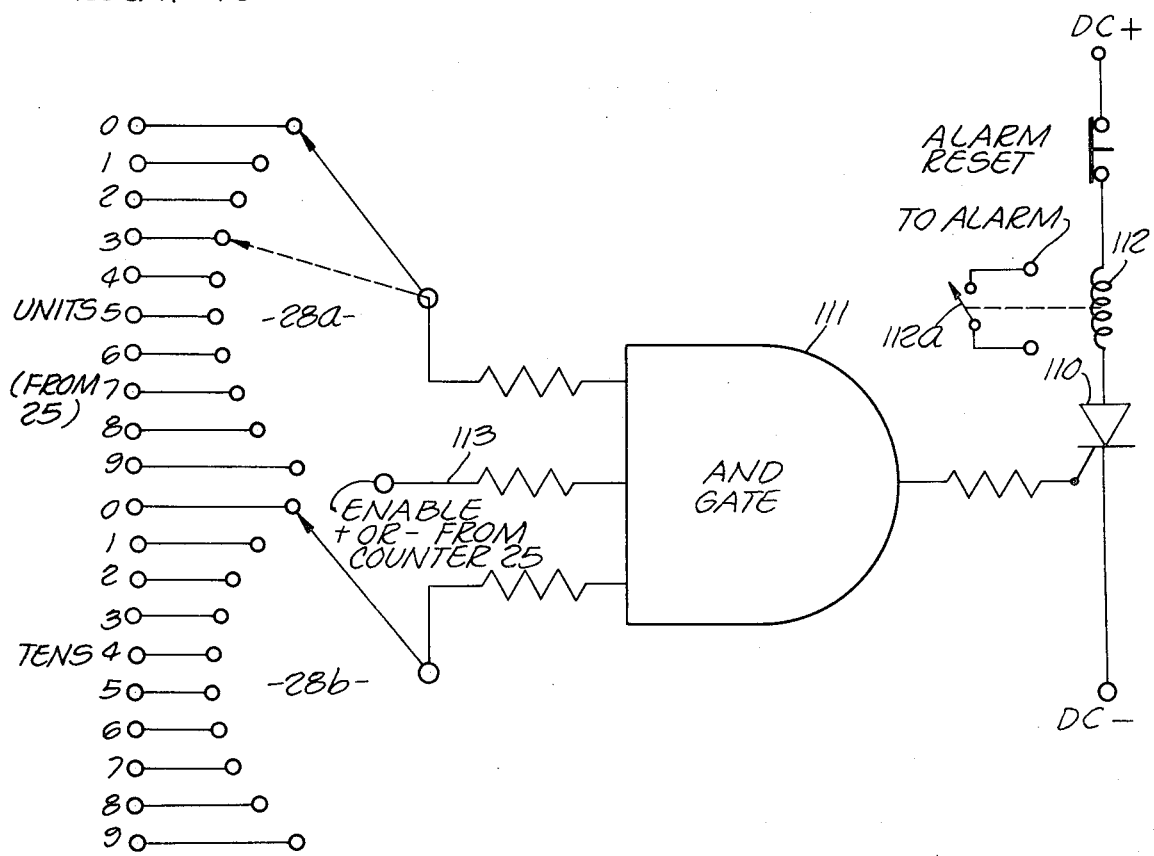
FIG. 4(F.)
FIG. 5(B.)

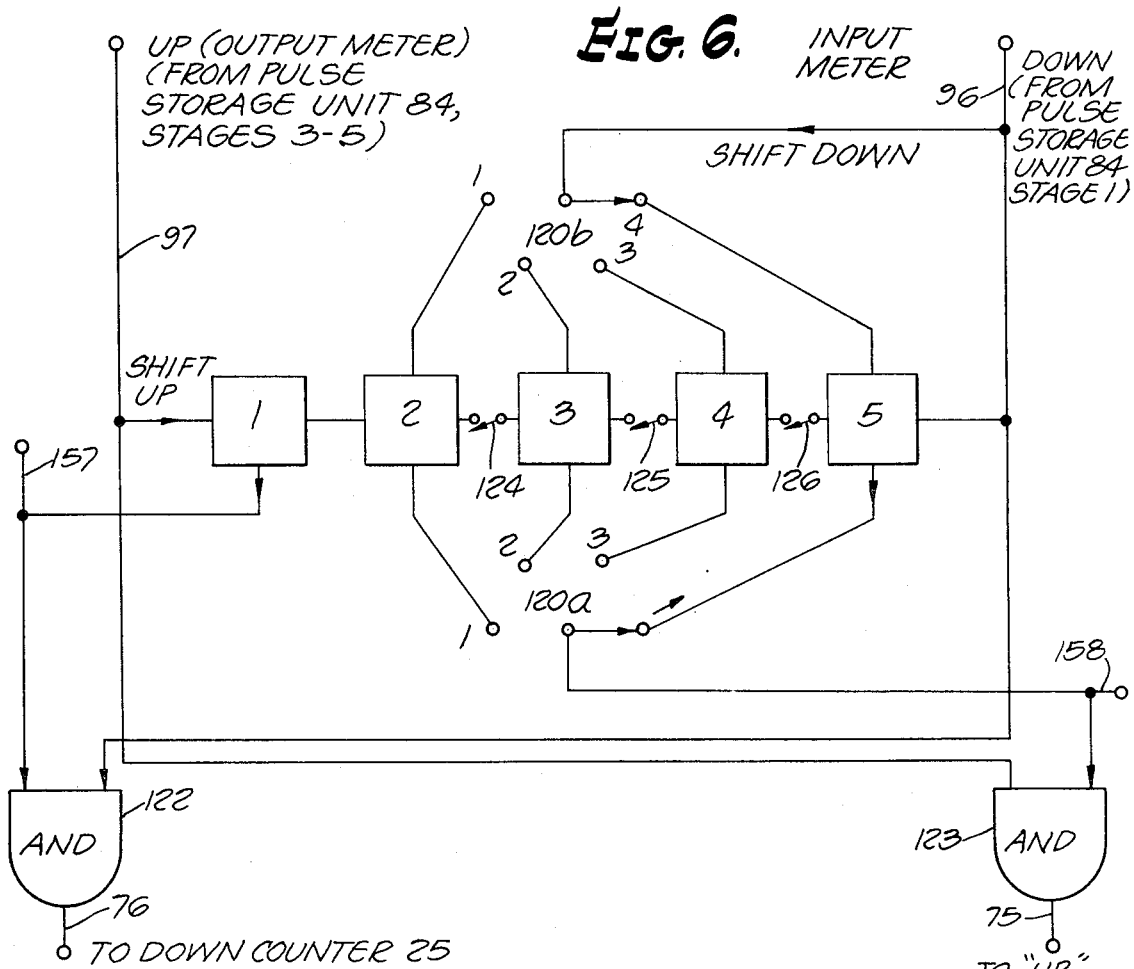
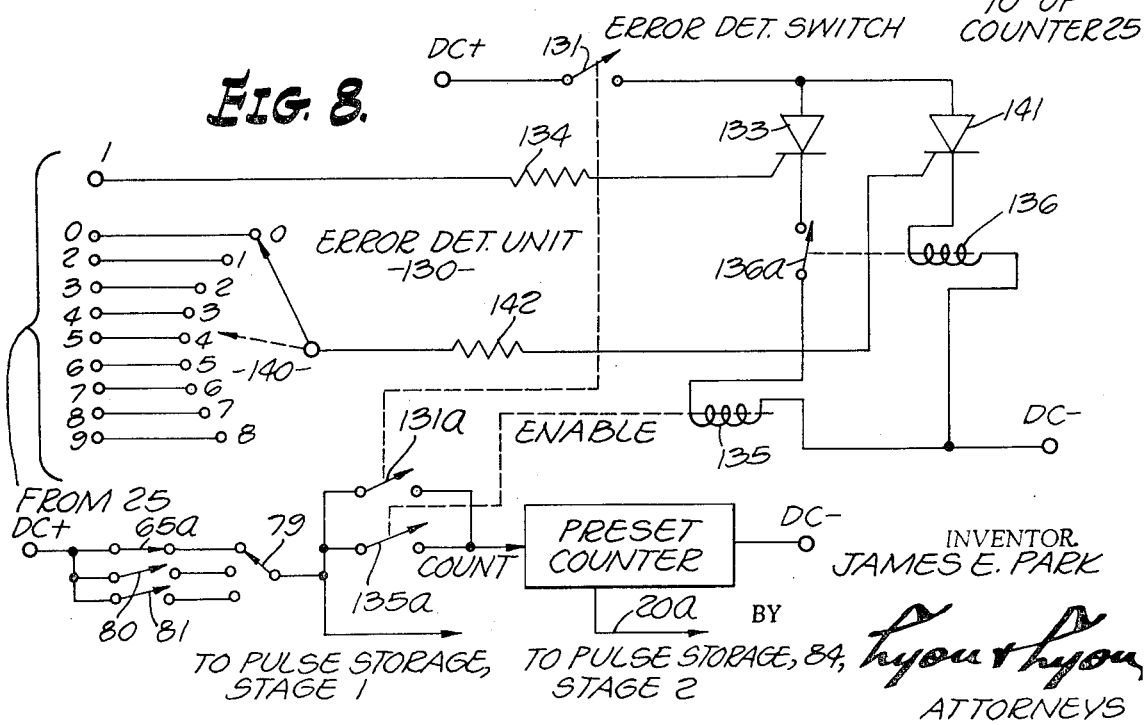

INVENTOR.
JAMES E. PARK
ATTORNEYS

PIPELINE MONITORING SYSTEM

The present invention relates to a pipeline monitor for monitoring the volume of liquid into and out of a pipeline system and for providing control signals in the event of a leak or the like.

In the past, various types of monitoring systems have been devised for detecting malfunctions of meters used in the pipelines, and for detecting leaks or loss of fluid from the pipeline. One prior system for example monitors the flow into and out of a pipeline over a predetermined period of time, and provides an output alarm signal in the event that there is a volume deviation between input and output of a predetermined amount over the predetermined period of time. For example, a 40 barrel deviation in 45 minutes, or a 200 barrel deviation in 8 hours, could be considered abnormal deviations and are detected. However, a need exists for a method of monitoring a pipeline for a very small leak and detecting and alarming when a preset amount of fluid is lost, as well as be readily capable of monitoring the conditions of a complex pipeline system having multiple input or output meters.

Accordingly, it is a principal object of the present invention to provide an improved pipeline monitoring system.

Another object of this invention is to provide a novel fluid volume difference measuring system for pipelines and the like.

Additionally, it is an object of this invention to provide means for precisely determining the normal difference between input and output meters and to compensate for this difference, allowing for the detection of a very small leak. This normal difference having been accurately obtained can further be used to calculate a combined meter factor for a remote meter.

These and other objects and features of the present invention will become better understood through a consideration of the following description taken in conjunction with the drawings in which:

FIG. 1 is a diagram of a control panel for a pipeline monitor according to the present invention;

FIG. 2 is a simplified system block diagram of a pipeline monitoring system according to the present invention;

FIG. 3 is a detailed block diagram illustrating the concepts of the present invention;

FIG. 4(F) is a pulse diagram;

FIG. 5(B) is a diagram of an alarm circuit;

FIG. 6 is a block diagram of an up-down shift register;

FIG. 8 is a detailed diagram of an error determining unit;

Figure 7:
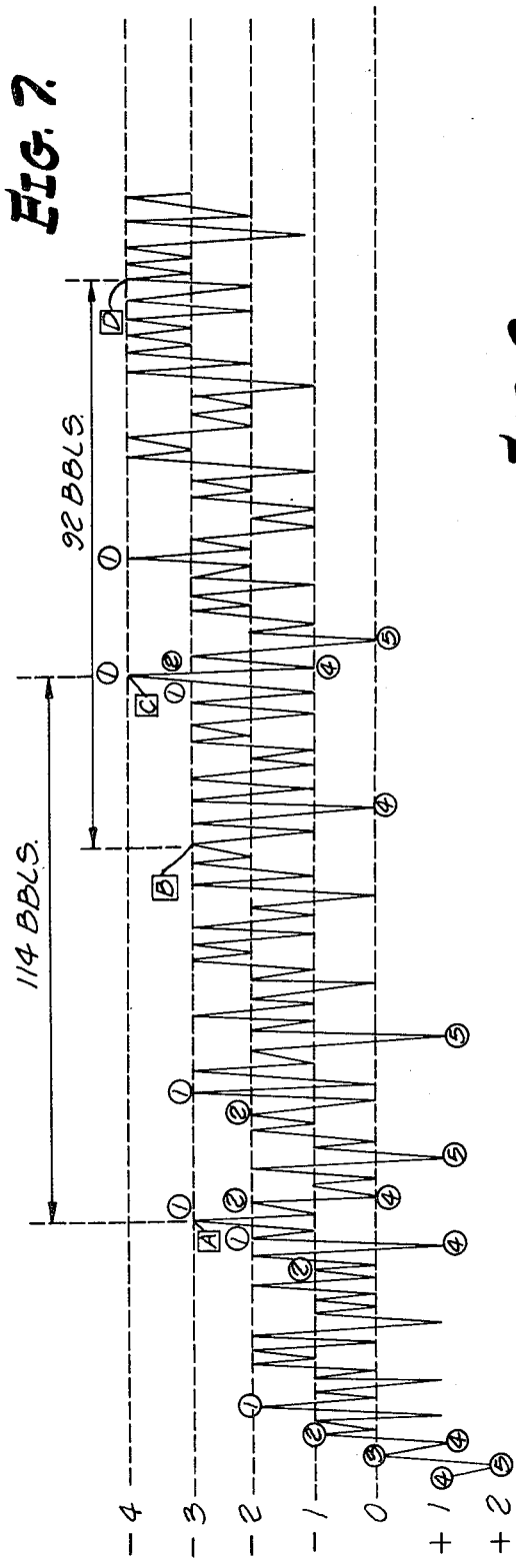
FIG. 7 is a pulse waveform diagram.

Turning now to the drawings, and first to FIGS. 1 and 2, there is shown a control panel 10 of the present pipeline monitor including a first plurality of switches 11 through 13 for selecting input meters, and a second plurality of switches 14 through 16 for selecting output meters of the line to be monitored. It will, of course, be apparent to those skilled in the art that if input meter No. 1 and output meter No. 1 are being used, switches No. 11 and No. 14 are actuated to select these particular meters. On a products pipeline, liquid enters the pipeline through one meter at a time only, but can be removed simultaneously through several meters. On gathering lines for a crude oil system, the converse is true. Therefore on a products pipeline one may wish to select more than one input meter. An on-off switch 17 is provided to turn on and off the unit, and a reset switch 18 is provided for resetting counters within the monitor which will be described in more detail subsequently.

A preset counter 20 is provided having a display 21 of a preset number and a display 22 of the actual count registered since the counter was last reset. This preset counter 20, as will be described later, counts the pulses from the input meter and upon reaching the preset number indicated at 21 provides an output pulse, and then is reset to begin a new cycle. The number shown at 21 is an error value as will become apparent subsequently. This signal is applied, along with signals from an output meter, to a difference counter 25 to indicate the difference between input and output fluid volume. Alarm thumb wheel switches 28 and trip thumb wheel switches 29 also are provided. The alarm switches 28 may be set to a value so as to provide an audible alarm when the difference counter 25 reaches the set value. Similarly, the trip switches 29 can be set to a value at which the pipeline will be shut down if the difference counter 25 reaches this preset value.

FIG. 2 illustrates a block diagram of a monitoring system having a monitoring point 30 at which the monitor 10 is located. Input meters 31 through 33 are connected with the pipeline 34 at the input end thereof, and output meters 37 through 39, respectively, are connected at the output of this pipeline. The electrical outputs of the meters 31 through 33 and 37 through 39 are connected to the monitor 10 as indicated by lines 41 through 46. The outputs of the meters which are not located at the monitoring point 30 (i.e., the meters other than 31) are telemetered back to the monitor 10. Each of the meters provides an electrical output signal upon measuring a desired unit or units of volume; such as, one output pulse per barrel of liquid.

The pipeline monitor may be basically considered as a difference counter that registers the difference between the volume units (e.g. barrels of liquid) put into the pipeline and those removed. Inasmuch as there is a difference in these volume units as a result of mechanical, gravity and temperature factors, each time a predetermined number of units are put into the pipeline, one unit can be added to either the input or the output meter count thereby resulting in a null difference between the counts. Stated another way, the system is a difference counter that counts the difference between gross barrels of liquid metered into the line as compared to the gross barrels metered out of the line, and includes circuitry for determining and applying an error factor that compensates for any normal differences between input and output meters. The result is that input barrels plus the error factor equals the output barrels.

The error factor in the example shown in FIG. 1 is "1" for an error value count of "482" as indicated on display 21 of the preset counter 20. In this case, the input meter may indicate that 482 barrels of fluid have been applied to the line; whereas, the output meter for that line indicates that 483 barrels have been removed. Thus, when 482 barrels input are counted, a count of "one" is added to the input count to give equality between input and output counts. Now, when the deviation is greater, this fact is detected as will be covered subsequently to provide the alarm or trip signals as noted earlier. Thus, alarm and trip set-points are available as selected by switches 28-29 to warn the operator of the pipeline system when the difference count exceeds a preset value that would be indicative of a leak or other abnormal loss of fluid. It will be appreciated that in order for the system to detect relatively small leaks, the error factor must be accurate and, accordingly, several methods for determining an error factor will be discussed herein.

Turning again for the moment to FIG. 2, suppose that pipeline 34, is to be monitored using meters No. 3, input and output meters 33 and 39 are selected by the respective switches 13 and 16 on the monitor 10 in FIG. 1. A calibrate switch 48 in FIG. 1 may be moved to the calibrate position for enabling an error factor to be determined, and the difference counter 25 and preset counter 20 are reset to zero by means of a reset switch 18. During this calibrate sequence, when the difference counter 25 advances from zero to one, the preset counter 20 is enabled and will begin counting each pulse from the input meter 33. Assume now, for example, that when the counter 25 advances from 1 to 2 that the preset counter 20 has counted 482 input pulses, indicating 482 barrels input. As the counter 25 advances to a count of 2, the preset counter is gated off and ceases counting the input pulses. If the operator desires to know when this operation is complete, he can set the alarm switch 28 for "02," and an alarm will sound when the difference counter advances from 1 to 2. The operator now has a barrel error value which can be set into the counter 20 as indicated at 21 to provide an error factor.

The calibrate switch 48 can now be turned to off, and the difference counter 25 and preset counter 22 reset. The alarm and trip points, such as "03" and "06," may now be selected. If the difference counter in the calibration mode registered "minus" 2, an error selector switch 50 is moved to the left to add one pulse (error factor) to the output meter count each time the input meter count reaches 482. If, on the other hand, the difference counter 25 had registered "plus" 2, the switch 50 would be moved to the right to add one pulse to the input meter count each time the input count reached 482.

With the error factor now set, the difference counter 25 will remain at essentially zero under normal conditions. If a leak occurs with the alarm set at "03" as indicated at FIG. 1, an alarm will be sounded when 3 volume units (e.g., 3 barrels) are lost. If the count advances to "06," the pipeline pumps will be shut down. Although reference is made herein to volume units, it is to be understood that these may be any convenient units of volume for which the meters are calibrated, and typically are barrels in pipeline systems, and thus reference will be made to barrels as typical volume units.

Turning now to the more detailed diagram shown in FIG. 3, a pipeline 60 is illustrated including an input meter 61 and an output meter 62 therein. Typical meters are turbine meters, but positive displacement type meters may be used. Plural input or output meters for a pipeline may be monitored. The electrical output from each meter is fed to a respective dividing unit, or digital totalizer, 63 and 64. Typical turbine meters generate a large number of pulses for each barrel of through-put. For example, A.O. Smith Co. turbine meters generate 500 or 1,000 pulses per barrel depending on the size of the meter. Therefore, A.O. Smith Digital Totalizers No. 1521 can be used for the units 63 and 64 to divide the meter count by the appropriate number to provide one output pulse for each barrel of fluid measured by the respective meter. The typical output pulse is a 24 volt d.c. pulse which in turn is used to operate 24 volt d.c. relays (such as Potter and Brumfield No. KRP-14DG) relays 65 and 66, respectively. These relays operate one time for each gross barrel of liquid through the respective meter.

The relay 66 for the output meter 62 includes a normally closed contact 66a within a telemeter loop 67 to normally maintain a relay 68 energized from a source 69. Each time a barrel of fluid is recorded by meter 62, relay 66 is momentarily energized by the divider 64, and the contact 66a thereof is opened thereby momentarily de-energizing relay 68 in the telemeter loop 67. Additionally, each time a barrel is recorded by the input meter 61, the relay 65 is likewise momentarily energized. The operation of the relays 65, 66 and 68 is illustrated in waveforms (a) and (b) of FIG. 4. Other waveforms in this figure pertain to circuits to be described subsequently.

The system of FIG. 3 includes a difference or bi-directional counter 25 with an input 75 for counting up and an input 76 for counting down. It also has an output 77 for providing a signal upon advance from state to state which is used in determining an error factor.

Pulses from the input meter 61 are entered into the monitor by means of a contact 65a of the relay 65, and an input selector switch 79. Contacts 80 and 81 are illustrated associated with the input switch 79, and these contacts are for second and third input meters, and are similarly operated by the other input meters, not shown. Inasmuch as there may be several input meters, such as three in the present example, but more may be involved, the selector switch 79 is used to select the input meter through which the volume of product is entering the pipeline 60 being monitored. The pulse supplied by the momentary closure of contact 65a is stored in the first stage or first storage unit 83 of a pulse storage unit 84. This pulse also is applied to the count input of a preset or predetermining counter 20 which in turn is advanced one count for each gross barrel of liquid metered through the selected input meter 61. Each time the counter 20 reaches the preset total (such as 482 as discussed in connection with FIG. 1), it momentarily closes a contact and returns to zero to begin a new cycle. When this contact is closed, it allows this event to be stored in the second stage 87 of the storage unit 84.

Turning to the output meter 62, the relay 68 in the telemeter loop 67 includes a contact 68a which corresponds to the output meter 62. Similar contacts 89 and 90 correspond to two other output meters. The contact 68a operates one time for each barrel of liquid metered through the output meter 62, and 68a closes causing a pulse to be stored in the fifth stage of the pulse storage unit 84. The pulses from the other two meters (not shown) are stored in a similar manner in the fourth and third stages, respectively, upon closure of switches 89-90 when they are being monitored. A ring counter 92 is coupled to stages 1-5 of the storage unit 84 and has five stages driven by an oscillator or pulse drive source 93 to cause the stages of the unit 84 to be stepped from stage 5 to stage 4, stage 4 to stage 3, and so forth. Each time the ring counter 92 steps to a new stage, this stage provides an output pulse to the corresponding storage unit and causes any stored pulse to be released out into a shift register 95 and counted in the bi-directional counter 25. This particular arrangement prevents simultaneous, or near simultaneously arriving pulses from not being counted. In an exemplary system, the ring counter 92 can scan the storage units 12 times per second, but any suitable rate can be used. Also, more meters can be maintained by increasing the number of stages in the storage unit 84 and ring counter 92.

It should be noted at this point that pulses from the input meter 61, and other input meters employed, cause the bi-directional counter 25 to count "down" because the same are applied from a line 96 through the shift register 95, and the line 76 to the "down" input of the counter 25; and pulses from the output meters cause the counter 25 to count "up" because of the application of pulses therefrom through line 97, the shift register 95, and the line 75 to the "up" input of the counter 25. An error selector switch 50 allows the error factor pulse on line 101 from the second stage of the storage unit 84 to be added to the "up" count on line 97, to be added to the "down" count on line 96, or not be added at all. The output of the counter 25 is coupled with the alarm select switch 28 and the trip or shut down selector switch 29 to provide control signals when the count in the counter 25 reaches the preset value for alarm and/or trip.

Turning now to a detailed discussion of the alarm and shut down circuits 28 and 29, FIG. 5 illustrates a selector switch and circuit which may be used for both the alarm selector and trip or shut down selector and output circuit thereof. Inasmuch as these are alike, FIG. 5 will be described in terms of the alarm feature. A units thumbwheel 28b switch are connected to respective units and tens outputs of the counter 25. The input terminals are connected to the output terminals of the counter which drive the output display tubes, such as Nixie tubes. These switches are set for the number of barrels of deviation on the difference counter 25 at which alarm or pump shut down is to occur. Assume, for example, that an alarm is desired when three barrels are lost. The units switch 28a is set to position 3 and the tens switch 28b is set to zero. When the difference count registered by the counter 25 reaches "03," SCR110 is gated through an AND gate 111 to energize a relay 112 which in turn operates a switch contact 112a which in turn may be coupled with an external alarm circuit. The middle input 113 to the and gate 111 is connected to the polarity (+,−) output of the counter 25. As noted, an identical circuit as shown in FIG. 5 is used for the shut down feature. Additionally, the circuit may be used to sound an alarm when a gain of a selected amount is recorded, for example "+02" barrels. This is useful because if the pipeline system is normally gaining even with error factor correction, it could develop a leak which would allow fluid to leak at the same rate as the gain, and the leak would go undetected. Additionally, if the system in normal operation shows a gain of, for example "+05" barrels at a given time with the alarm set at "03," the system would have to lose eight barrels before the leak would be detected. Thus, the circuit of FIG. 5 may be advantageously used to provide an alarm at a predetermined gain, which may be selected by wiring the circuit for a particular gain rather than using a selector switch if desired.

If the present monitor system is employed on a pipeline having multiple inputs or multiple outputs, the alegebraic sum of the metered pulses from the plural input or output meters entering the monitor system will fluctuate. FIG. 7 depicts the instantaneous sum of meter pulses on a typical pipeline having one input meter and four output meters. Starting at the left of FIG. 7, the counter 25, without the shift register 95, would read +1, +2, 0, −1, +1, 0, −1, +1, etc. To prevent this undesirable fluctuation, an "up-down" shift register 95, as illustrated in FIG. 6, preferably is used.

The chart in FIG. 7 shows the instantaneous sum of pulses received from four output meters and one input meter. Pulses from the output meters may be considered to move the graph as indicated by lines 4, 3, 2, 1, 0, 1, 2 down; whereas, pulses from the input meter may be considered to move the graph lines up. The circled number 1 denotes the position of the shift register, or "on" state thereof. The pulse denoted by A is counted by the counter 25. Point B indicates the 10th pulse, and the counter 25 counts the pulse indicated at C. Similarly, point D indicates another 10th pulse. It will be noted that at scale line "−3" there are ten pulses from point A to point B similarly, at scale line "−4" there are ten pulses from Point C to Point D.

Turning to the shift register, FIG. 6 illustrates a five stage, up-down shift register than can be reduced to a four, three, or two stage shift register by operation of a selector switch 120a–120b. Pulses from the input meter 61 of FIG. 3, applied from the first stage 83 of the storage unit 84 by line 96 cause the shift register in FIG. 6 to shift down one stage for each pulse received. If a pulse is received to drive the register down when the first stage number 1 thereof is on, this pulse will be applied by an AND gate 122 to the down input line 76 of the bi-directional counter 25 and counted thereby, and the register will remain in this state. Pulses from the output meters, applied from the third, fourth and fifth stages of the storage unit 84 by line 97 drive the register in FIG. 6 up. If a pulse is received on the line 97 to drive the register up when the register stage number 5 is on, this pulse will be applied by an AND gate 123 to the up input 75 of the bi-directional counter 25 and be counted thereby, and the register will stay in this state.

Turning again to the waveform in FIG. 7, when the shift register of FIG. 6 is employed in the pipeline monitor system, the "on" stage of the shift register will oscillate between stage No. 1 and stage No. 5. Once this span is established the bi-directional counter 25 is zeroed and this span will represent zero. Starting at the left of FIG. 7, the shift register stages "on" are Nos. 4, 5, 3, 4, 2, etc. At points A and C in FIG. 7, a pulse is received from the input meter on the line 96 while the shift register is in the No. 1 state (stage No. 1 is on). The bi-directional counter 25 will count these two pulses only, because of the use of the shift register. It can be seen from FIG. 7 that use of the shift register of FIG. 6 will allow the bi-directional counter 25 to count only those pulses that actually represent a gain or loss in pipeline throughput. The switch 120a–120b is used to select the number of output meters used. It is shown positioned for four output meters. If three output meters are used, the switch 120a–120b is moved to the number 3 position, and switches 124 and 125 will be closed and switch 126 will be open. This action reduces the shift register to four stages. With the switches in these positions, a pulse will be counted from an output meter if received while the register is in its No. 4 state (i.e., stage four is on). With the switch 120a–120b moved to the number one or number two positions, the shift register is reduced to two or three stages respectively. The number of stages required is equal to the number of output meters being used, plus one. The exemplary system just described is used for a single input meter and multiple output meters for a given pipeline. This arrangement is normal for a products pipeline. On the other hand, crude oil lines may employ multiple input meters and a single output meter. The monitor system and the shift register of FIG. 6 will work equally well with this arrangement also.

Turning now to a more detailed discussion of manner in which error factors may be determined, reference should be made to FIG. 8 which illustrates an exemplary error determining unit 130 which is shown in block diagram form in FIG. 3 coupled with the preset counter 20. The bi-directional counter 25 is reset to zero and error determining switch 131 is closed. This closes contact 131 and opens contact 131a, and opens a contact 131b of the input of the error selector 50 in FIG. 3. When the counter 25 advances from zero to one, an SCR 133 is gated through a voltage dropping resistor 134 connected to pin No. 1, which drives a numberic display, such as a Nixie tube, of the units decade of the counter 25. The SCR 133 energizes a relay 135 through a closed contact 136a. When the relay 135 is energized, contact 135a thereof closes and allows the preset counter 20 to count each time a contact 65a, which is operated by relay 65 of input meter 61, is closed and opened. This contact 65a operates one time for each gross barrel through the input meter as explained earlier. A selector switch 140 is used to determine the number of barrels gained over which the error factor is to be computed. For example, if the switch 140 is set at position No. 4 indicated in dashed lines in FIG. 8, the total count on the counter 20 will be divided by four to determine the error factor. When the bi-directional counter 25 has advanced the number of barrels set on switch 140, in this example −4, and when the counter 25 advances to "five" SCR 141 is gated through resistor 142 to energize a relay winding 136 to open contact 136a. When contact 136a opens, relay 135 is de-energized thereby opening contact 135a to stop the counter 20 from counting input signals.

The count now read on the counter 20 is the number of barrels metered through the input meter while the difference between input and output meters deviated four barrels. This total count is divided by four to determine the number of barrels through the input meter while one barrel was gained or lost. If the counter 20 had counted 1,000 barrels for example, dividing by four results in 250 barrels being recorded by the input meter while the input and output meters deviated by one barrel. If the sign of the difference count of the counter 25 is negative, for example, it means that while feeding 250 gross barrels into the pipeline, 249 were removed. The number 250 is preset into the counter 20 and the error determining switch 131 is returned to its normal open position. Additionally, the error selector switch 50 in FIG. 1 and in FIG. 3 is set to the "add to output" position. Now, each time the counter 20 counts 250 barrels from the input meter, it applies an output on a line 20a and supplies a pulse which is stored in the second stage of the pulse storage unit 84 in FIG. 3 to add one pulse (through line 101, switch 131b, switch 50, line 97, shift register 95 and line 75) to the output meter count.

An error factor determined as described above using the circuit in FIG. 8 will be accurate only if a single output meter and single input meter are used, or if the error factor is determined while the system gains or loses several barrels. Referring again to FIG. 7, if the preset counter 20 starts counting pulses upon receipt of the pulse at point A in FIG. 7, and the counter is stopped when the pulse at point C is received, there would be obtained an error factor for 114 barrels. As will be apparent, the starting and stopping of counter 20 is controlled by counter 25 through line 77. If the waveform in FIG. 7 were extended to show a loss of several barrels, it would be found that the number of barrels per error factor of 1 would vary over a wide range, typically from 50 to 130. The error factors could be averaged while a given number of barrels, such as 10, are registered as a loss and obtain an error factor for approximately 92 barrels.

However, if on the other nand the counter 20 starts counting pulses from the input meter the tenth time the shift register of FIG. 6 (95 of FIG. 3) goes to its number one state as explained earlier (after the bi-directional counter 25 has increased its count, as at point B, to start the counter through line 77), and then stop the counter 20 from counting pulses from the input meter the tenth time the shift register goes to its number one state (after the bi-directional counter has advanced to a second count, as at point D which will disable the counter 20), there will be obtained an error factor for 92 barrels. If the chart in FIG. 7 were extended to show ten barrels gained, it would be found that a factor obtained in this manner would vary typically from 89 to 95 barrels. An average of two or three consecutive factors will result in a very accurate error factor. This improved accuracy is a result of the fact that the time interval between "on" states for the first stage of the shift register is erratic and long when a loss is first registered. This interval becomes much less after 10 advances of the shift register to its number one state.

Figure 9:
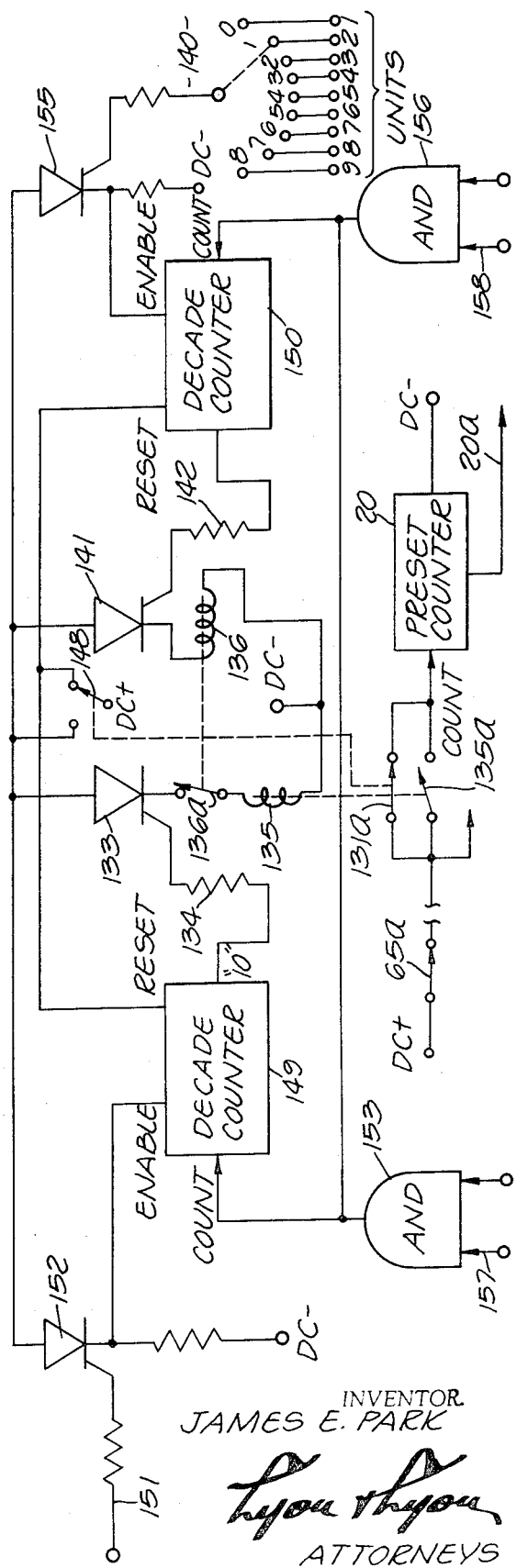
FIG. 9 is a detailed diagram of a modified error determining unit.

Accordingly, a circuit as shown in FIG. 9 may be used to perform the function described above. This circuit essentially provides control signals for each 10 barrels counted. This circuit is a modification of FIG. 8, and components having the same function as in FIG. 8 are identified with similar reference designations. An error determining switch 148, similar to the switch 131 of FIG. 8, is moved to the position shown in FIG. 8 to reset to zero the present counter 20, the bi-directional counter 25, and decade counters 149 and 150. Then, the switch 148 is moved to open switch 131a and open switch 131b of FIG. 3. As soon as the count on the bi-directional counter 25 advances from zero to one, the "one" output therefrom is applied by line 151 to gate SCR 152 on to thereby apply a positive voltage to enable the decade counter 149. This action will occur at point A on the waveform in FIG. 7. If the count on the bi-directional counter is negative, as would be the case as shown in FIG. 7 at point A, the AND gate 153 will allow a pulse to be counted by the decade counter 149 each time the shift register goes to its state one position. Line 157 from stage one of the shift register in FIG. 6 is one input to the and gate 153 and the negative (−) polarity output of the counter 25 is the other input. On the 10time the shift register goes to its state one position, as at point B on FIG. 7, the decade counter 149 (which divides by 10) will 10"on" SCR 133 to start the preset counter 20 counting as explained previously by causing switch 135a to close. The selector switch 140 is used to select the number of barrels gained or lost over which the error factor is to be determined. For example, assume the selector switch 140 is set at the number 1 position as shown in FIG. 7. This position is coupled with the units decade of the bi-directional counter 25 controlling the number two digit of the readout display. Therefore, as soon as the bi-directional counter advances from −1 to −2, as at point C in FIG. 7, SCR 155 will be gated on to enable the decade counter 150. The counter 150 counts each time the shift register advances to stage 1. The 10th time the shift register goes to state one, the counter 150 will gate on SCR 141 to stop the counter 20 by de-energizing winding 135. Had the count on the bi-directional counter 25 been positive (+), an AND gate 156 would have advanced counters 149 and 150 each time the shift register advanced to its highest position, in this example, the state five position. The AND gates 153 and 156 are similar to the AND gates 122 and 123 of FIG. 6. The inputs to the AND gate 156 are respectively the line 158 from the selector switch 120a of the shift register in FIG. 6 and the positive (+) polarity output of the counter 25. Thus, the AND gate 153 is enabled when the bi-directional counter 25 indicates a negative (−) polarity, and the AND gate 156 is enabled when the counter 25 indicates a positive (+) polarity to thereby allow the decade counter 149 to count pulses from stage 1 of the shift register and allow the decade counter 150 to count pulses from stage 5 (or stage 4, 3, or 2 if selected by switch 120a–120b) of the shift register. The input terminals to switch 140, as will be apparent, may be connected to the pins on the units display tube output of the bi-directional counter 25 that are "on" when the corresponding numbers are displayed.

Another approach for determining an error factor for a remote meter will now be discussed. This method involves counting one pulse per barrel of product through a remote meter and at the same time counting one pulse for each 1/1000 barrel through the local or input meter. For example, 100 pulses from a remote meter can be counted, and during the same time 100.546 barrels are counted on the local meter. The timing used is such that a remote count can be considered as 100.000 barrels. Comparing the two counts yields an accurate factor while a selected number of barrels are being pumped through the pipeline system. This is an accurate method when only one input meter and one output meter are used.

Figure 10:
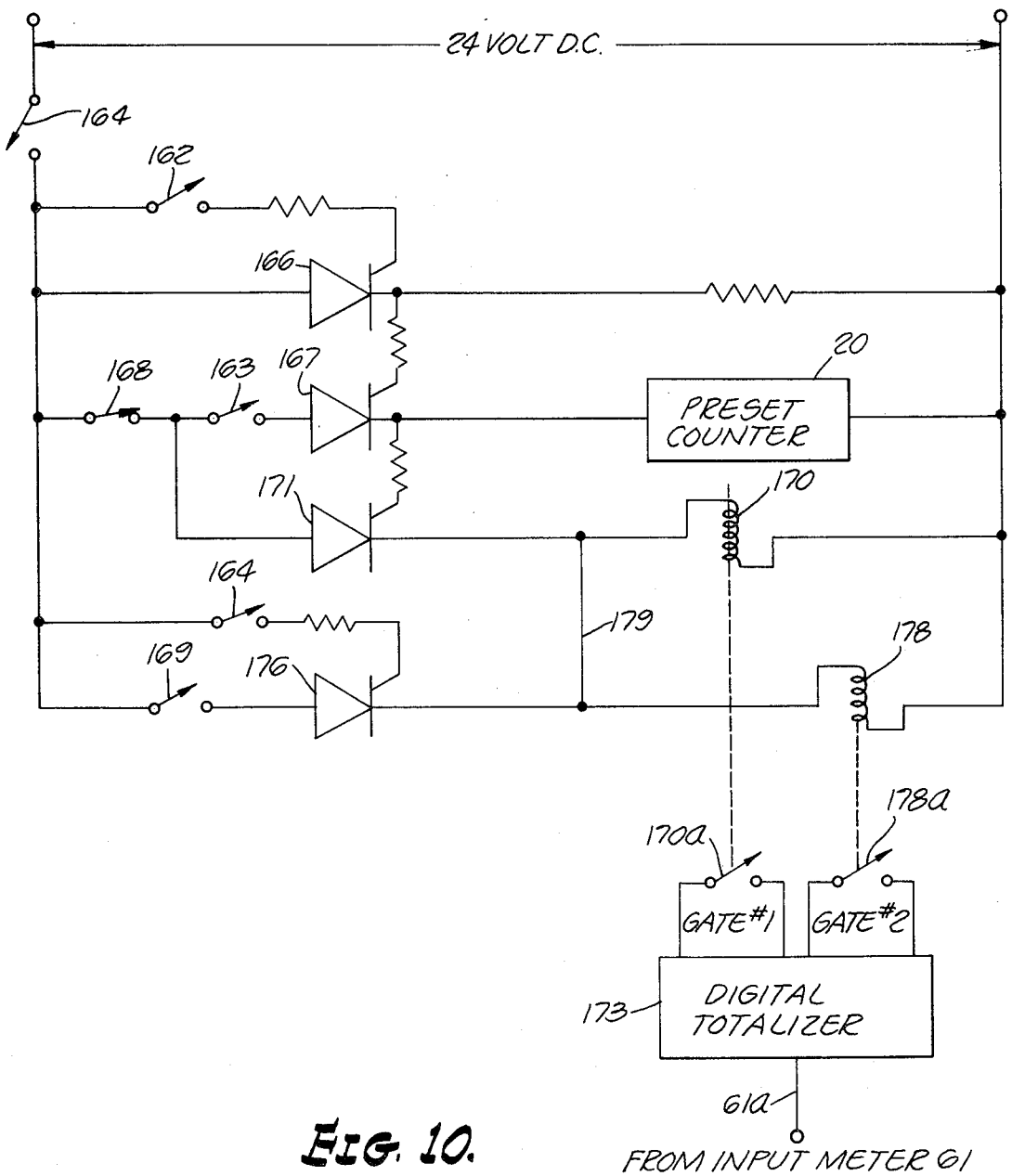
FIG. 10 is a diagram of an error factor determining unit.

Turning now to FIG. 10 and waveforms (c)–(f) in FIG. 4, a calibrate switch 164 is closed to obtain a factor, and is opened and reclosed when it is desired to obtain another factor. Switches 162 through 164 are contacts of a relay which operate one time for each barrel of liquid flowing through a remote meter. For example, switches 162 through 164 may be operated from relay winding 68 of the telemeter loop 67 as shown in FIG. 3. Assuming first that a complete barrel has not yet caused the switch 162 to be closed, nothing occurs. As soon as a barrel count pulse is received (such as when winding 66 for the remote meter 62 in FIG. 3 is energized thereby de-energizing winding 68) switch 162 closes and gates on SCR 166 which will remain on, once it is gated on, until the switch 164 is opened. The SCR 166 enables SCR 167. The next barrel pulse will cause switch 163 to open, and energize the counter 20 through switch 168, switch 163 and the gated on SCR 167. Simultaneously with this, a relay 170 will be energized through the switch 168 and gate on SCR 171 which is gated on by the output of the SCR 167. This relay 170 will remain energized until a predetermined value preset on the counter 20 is reached. When the relay 170 is energized, contact 170a thereof closes and gates on a digital totalizer 173 which begins counting a given number (such as 1,000) pulses per barrel from the input meter 61 of FIG. 3. For this purpose, the output of the local meter 61 of FIG. 3 is connected to the input 61a of the totalizer 173. As additional barrel pulses occur, switch 163 operates the counter 20 one count for each pulse received from the remote meter. When the nth pulse is received, as determined by the preset value in the counter 20, the counter 20 causes the switches 168 and 169 to shift positions (respectively open and close) when the counter 20 is de-energized following the end of the nth pulse. In other words, the contact 168 opens thereby de-energizing relay 170, and the switch 169 closes to enable the relay 170 to be re-energized at the start of the next barrel pulse. When the (n+1)th pulse occurs, switch 164 closes and in turn gates on SCR 176. This operation energizes the relay 170 through switch 169 and SCR 176, thereby causing switch 170a to close and gate totalizer 173 to stop counting. This exemplary counter, which may be an A.O. Smith No. 1522 is gated to count by shorting its gate input terminals, and is gated to stop counting by removing this short and then re-shorting the same gate input terminals. As some counters have separate gate-on and gate-off terminals, a relay 178 may be used for gating-off purposes in which case the line 179 is removed from the circuit. With this arrangement, the relay 170 drops out as described above to remove the gate-on by means of the switch 170a. On the (n+1)th pulse, relay 178 is energized and applies a gate-off signal by means of its switch 178a. The examplary system is described in terms of product flowing from an input meter to an output meter, but the converse will work equally well.

The remote turbine meter 62 in FIG. 3 generates 1,000 pulses per barrel. These pulses are fed to the divider or digital totalizer 64 which divides the pulses by 1,000 and provides an output pulse, (e.g., 24VDC) to operate the relay 66 one time for each barrel received. Each time the relay 66 is energized, its switch 66a opens to release or de-energize the relay 68, thereby closing its contacts 162, 163 and 164 in FIG. 10 as previously described. The battery 69 in the telemeter loop 67 of FIG. 3 may be any suitable d.c. supply capable of supplying approximately 60 ma through the telemetering loop.

It should be understood tat any particular given number of barrels per output pulse is arbitrary. One hundred barrels is a practical choice for setting into the preset counter 20. Using this value in an exemplary system, after completion of one hundred barrels through the remote meter 62, counter 20 and totalizer 173 of FIG. 10 cease counting. The barrel count on the counter 20 in FIG. 10 can be read as 100.000 and assume for example, that the counter 173 now reads 100.546. A factor to correct the remote meter 62 to the local meter 61 would be 1.00546, found by dividing the total from the counter 173 by the total from the counter 20. Suppose that the local meter 61 is calibrated by a measured volume provided thereto, and corrected for temperature, pressure, and gravity effects, which is common in the pipeline art. Suppose further that this combined factor is 0.9913. Multiplying 1.00546 by 0.9913 would yield a factor of 0.9967 for the remote meter 62. This factor would be a combined meter factor including temperature, mechanical, compression, and gravity compensation.

To obtain an error factor for the pipeline monitor system as disclosed herein, the following calculation is made:

$R$ = remote gross barrels,
$L$ = local gross barrels,
when $R+1 = L$ = error factor,
$1.00546R = L + R + 1$ (since it is known that remote meter pulses times 1.00546 is equal to local meter pulses as described above). Solving,
$1.00566R - R$ 1
$0.00546R = 1$.
Therefore, $R = 183$,
and, $R+1 = 184$ = error factor.

This factor means that each time 184 gross barrels are metered into the pipeline, 183 gross barrels are removed therefrom. Hence, each time 184 barrel counts are received from the local meter 61, one count is added to the remote barrel count as counted by the meter 62. This correction is added by the system in FIG. 3 as described previously, and maintains the difference count by the counter 25 at zero for normal conditions as described earlier.

If this method of obtaining error factor is used with the monitor of the present invention, the digital totalizer 63 (A.O. Smith No. 1521) may be replaced with an A.O. Smith No. 1525 which has a scaler feature for entering a factor, and thus counter 20 in FIG. 8 can be eliminated. In this instance, the factor above (1.00566) is simply entered into the No. 1525 totalizer 63.

To calculate a combined remote meter factor from an error factor, proceed as follows: assume that an error factor of 184 has been obtained and the sign while obtaining this factor was negative indicating a loss of one barrel while pumping 184 barrels. A factor to correct this remote meter to the local meter would be 184 183 or 1.00546. Using the local meter's combined factor from the previous example of 0.9913, a combined factor for the remote meter would again be 1.00546 × 0.9913 or 0.9967.

Figure 11:
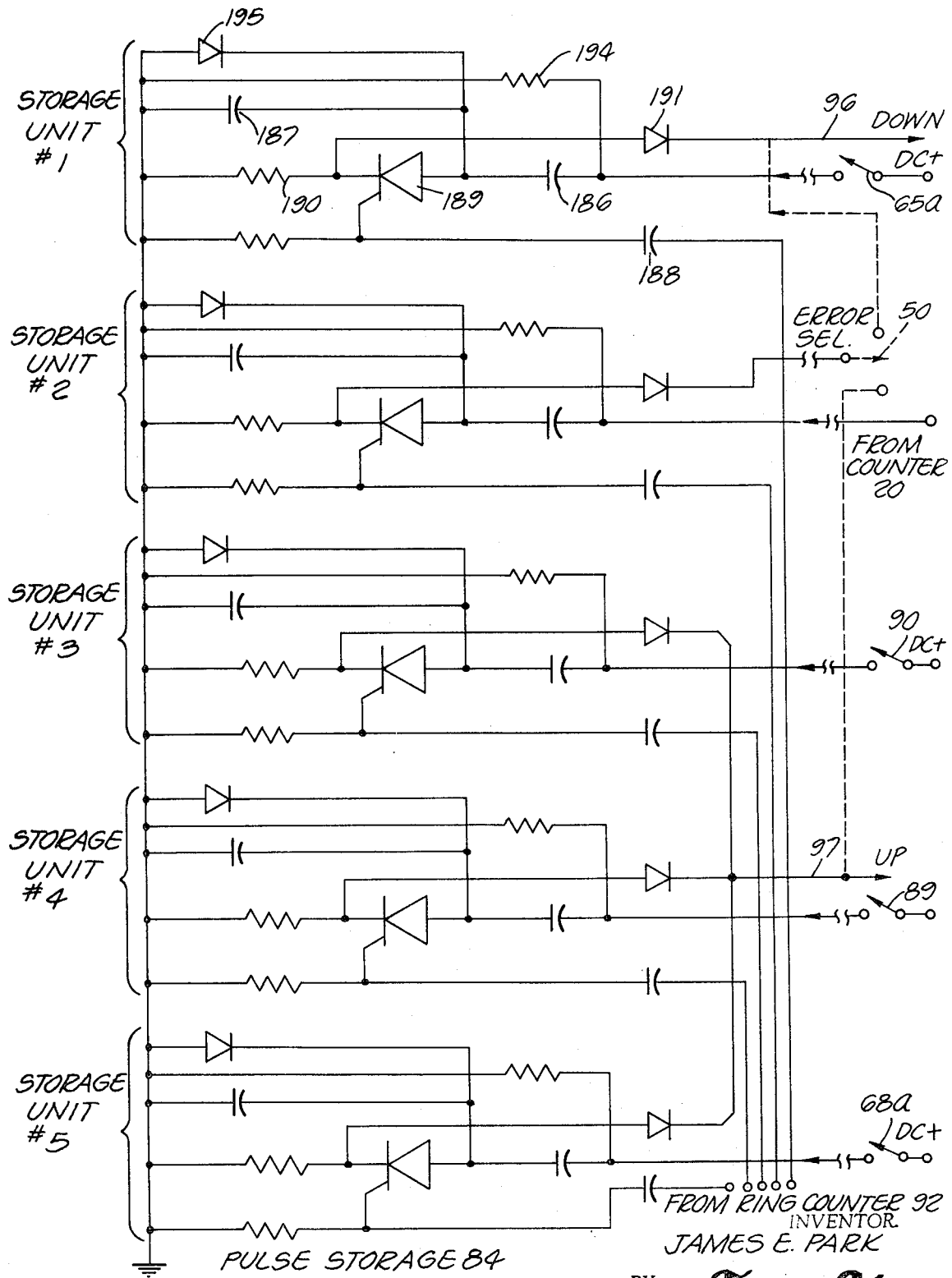
FIG. 11 is a circuit diagram of a storage unit.

The pulse storage unit 84 of FIG. 3 is shown in detail in FIG. 11. The switch contact 65a is one which is operated one time for each barrel of product registered through a meter, and may be operated by winding 65 for the local meter 61 in FIG. 3 for example. When the switch 65a closes, a capacitor 186 charges to its maximum capacity through a capacitor 187 which has a larger capacity than the capacitor 186. It can be seen that even if the switch 65a remains closed, no additional current will flow through the capacitor 186 once it becomes fully charged. This prevents a single pulse from being counted more than once. When a d.c. pulse is received from the ring counter 92 in FIG. 3, and described more fully in conjunction with FIG. 12, it pulses through a capacitor 188 and gates on SCR 189. SCR 189 now discharges the capacitor 187 through a resistor 190, causing a pulse to appear across the resistor 190. This pulse is fed through a diode 191 and an output line 96 to the shift register 95 in FIG. 3. As soon as the contact 65a opens, the charge in the capacitor 186 discharges through a resistor 194 and a diode 195, thereby preparing the storage unit to receive the next pulse. The remaining stages of the storage unit in FIG. 11 operate in a similar manner in response to input contact closures (e.g., output from counter 20, and switches 90, 89 and 68a of FIG. 3).

Figure 12:
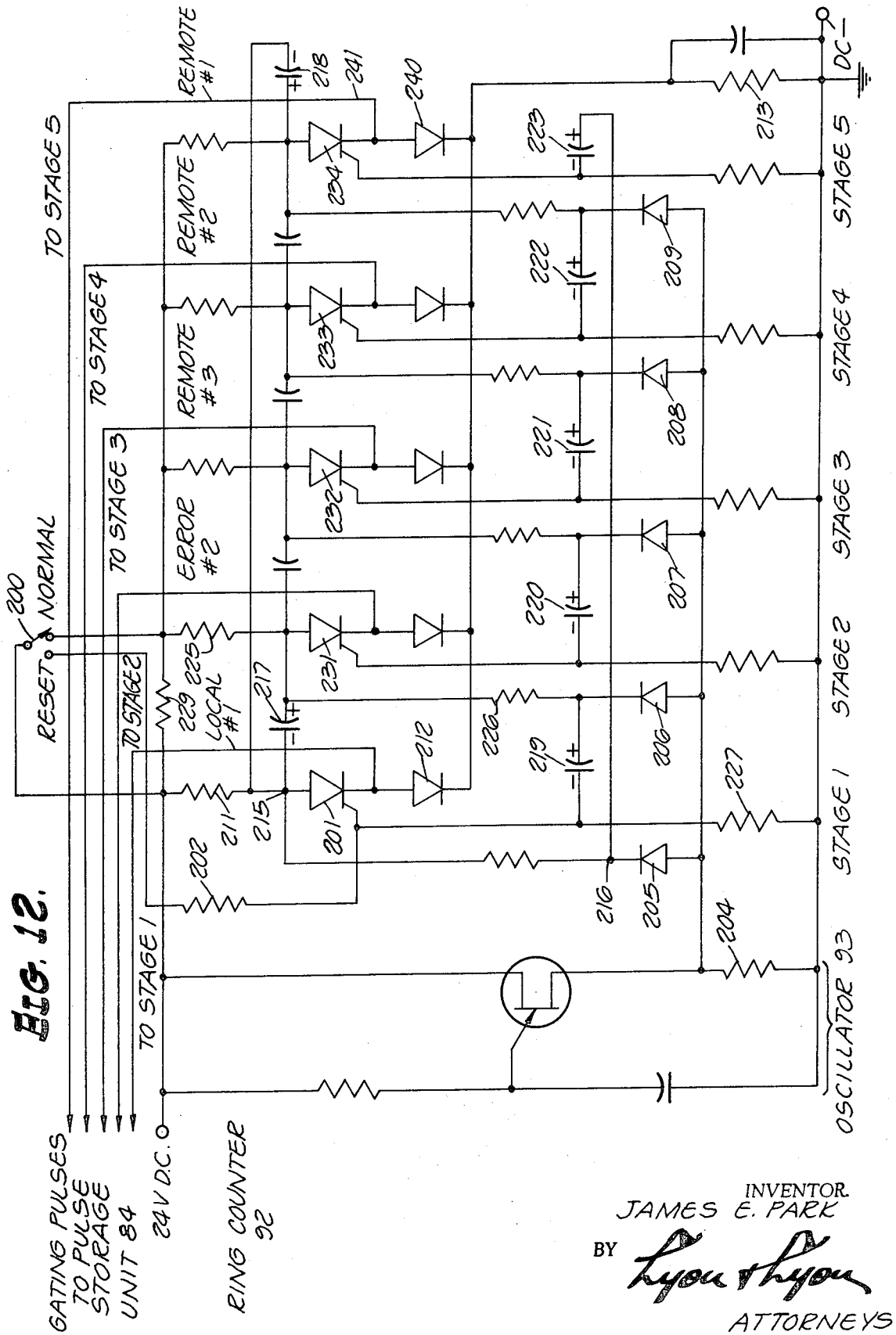
FIG. 12 is a circuit diagram of a ring counter.

The ring counter 92 of FIG. 3 is shown in detail in FIG. 12. This ring counter includes a reset switch 200 which is moved to the reset position after power is applied to the system. The reset operation removes power from stages 2, 3, 4 and 5 and applies power to the gate of SCR 201 in stage 1 through a resistor 202. This reset operation is performed to gate one and only one SCR on at the start of the operation, and the reset operation can be combined with the operation of the reset switch for the difference counter 25. When the reset switch 200 is returned to its normal position, power is applied to all stages. The output of the oscillator 93 is developed across a resistor 204 and is applied to each stage of the ring counter through diodes 205 through 209. At the completion of the reset described above, SCR 201 is gated on and conducts from the 24 VDC input terminal through a resistor 211, diode 212 and resistor 213 to ground. With the SCR 201 conducting, terminal points 215 and 216 become less positive, and capacitors 217 through 223 are charged to the polarities indicated in FIG. 12, but only capacitor 223 is not completely charged. A typical charging path for these capacitors is from the positive d.c. source through a resistor 225, resistor 226, capacitor 219, and resistor 227 to ground. This particular path charges the capacitor 219. During the reset period, capacitors 219, 220, 221 and 222 are charged through resistor 229 connected to the positive source, and this resistor is selected of a value which is large enough to prevent SCRs 231 through 234 from conducting. After resetting, the next pulse from the oscillator 93 across the resistor 204 is applied through the diode 205 and capacitor 223 to gate on SCR 234. This causes capacitor 218 to discharge which momentarily stops the current flow through the SCR 201 thereby cutting off this SCR. When the SCR 234 conducts, a positive voltage appears at the junction of the SCR 234 and a diode 240. This voltage is applied by line 241 to the pulse storage unit 84. Successive oscillator pulses gate stages 4, 3, 2, 1, 5 in a similar manner.

The preset counter 20 in the several figures is the same and can be Veeder Root Series 1847, MOde 1. The counter 173 in FIG. 10 may be an A.O. Smith No. 1522. Counters 63 and 64 in FIG. 3 may be A.O. Smith No. 1521 or No. 1525. The counter 25 in FIG. 3 may be a Veeder Root No. 1845. All relays may be Potter and Brumfield 24 VDC No. KRP–14DG. All SCRs may be RCA No. 2N 3228.

The present embodiments of this invention are to be considered in all respects as illustrative and not restrictive, the scope of the invention being indicated by the appended claims rather than the foregoing description, and all changes which come within the meaning and range of equivalency of the claims therefore are intended to be embraced therein.

What is claimed is:

1. A pipeline monitoring system for monitoring the flow of fluid into and out of a pipeline having coupled with the pipeline in spaced apart relationship an input meter and an output meter for measuring flow volume, comprising
    first pulse generator means coupled with an input meter for providing first output pulses representing units of flow volume,
    second pulse generator means coupled with an output meter for providing second output pulses indicative of units of flow volume,
    preset counter means for counting said first output pulses from said first generator means and providing an output signal upon receipt of a predetermined number of said pulses from said first generator means, said predetermined number being representative of an error value,
    bidirectional counting means having inputs for receiving signals indicative of the number of first and second pulses signals from said first and second generator means, and
    means to algebraically sum the output of said preset counter means at one of said inputs of said bidirectional counter means.

2. A system as in claim 1 wherein
said means for algebraically summing selectively adds the output of said preset counter with the input of said bidirectional counter indicative of output meter volume units from said second generator means or with the input of said bidirectional counter indicative of input volume units from said first generator means as a result of respective loss or gain of a volume unit difference over a period of time as indicated by the output pulses of said first and second generator means.

3. A system as in claim 1 including
a plurality of input meters coupled with said pipeline and a plurality of first pulse generator means respectively coupled therewith, and sampling means for selectively sampling the outputs of the respective first generator means.

4. A system as in claim 1 including
a plurality of output meters coupled with said pipeline and a plurality of second pulse generator means respectively coupled therewith, and sampling means for selectively sampling the outputs of the respective second generator means.

5. A system as in claim 1 including
a plurality of input and output meters coupled with said pipeline and a plurality of first and second pulse generator means respectively coupled therewith, and sampling means coupled with said pulse generator means for selectively sampling the outputs thereof.

6. A system as in claim 1 including
output means coupled with said bidirectional counter means for providing an output signal upon the occurence of a predetermined difference in count accumulation by said bidirectional counter means.

7. A system as in claim 1 including
pulse storage means coupled with the outputs of said first and second pulse generators and said preset counter means, and having first and second outputs, and
means coupling said first and second outputs of said pulse storage means with said bidirectional counter means.

8. A system as in claim 7 wherein
said coupling means comprises shift register means having a pair of inputs for receiving the outputs from said pulse storage means, and having a pair of outputs coupled with the inputs of said bidirectional counting means, said means to algebraically sum being coupled to receive signals indicative of the output of said preset counter means, and being coupled with the inputs of said shift register means.

9. A system as in claim 7 including
error determining means coupled to control the operation of said preset counter means and being responsive to said bidirectional counting means.

10. A system as in claim 1 wherein
the output signal of said preset counter means is coupled with pulse storage means, and an output of said pulse storage means is coupled as an input to said means to algebraically sum.

11. A pipeline monitoring system for monitoring a flow condition of a pipeline comprising
local meter means and remote meter means coupled with said pipeline for metering flow therein, each of said meter means providing a plurality of output pulses representing units of flow volume,
storage means coupled with said meter means for receiving pulses therefrom and providing first and second output signals,
bidirectional counter means coupled with said storage means for receiving said first and second signals, and
counter and error selector means responsive to one of said meter means for providing an error signal selectively addable with the first or second signals applied to said bidirectional counter means.

12. A method of monitoring a flow condition of a pipeline for detecting abnormal conditions such as a fluid leak and the like, comprising the steps of
   measuring the volume units of fluid into the pipeline at a first location and providing a plurality of electrical pulses related to said volume units,
   measuring the volume units of fluid output from the pipeline at a second location and providing a second plurality of pulses representing said latter volume units,
   applying said first and second pulses to means for detecting a difference therein, and
   selectively algebraically adding an error factor with said first or second pulses, said error factor being in the form of an electrical signal representing a normal deviation between input and output volume units as distinguished from an abnormal deviation as a pipeline fluid leak and the like.

13. A method as in claim 12 wherein
   said error factor is selectively added with said first pulses where said second pulses exceed said first pulses in number during the application of a given number of volume units applied to said pipeline.

14. A method as in claim 12 wherein
   said error factor is added with said second pulses where said first pulses exceed said second pulses in number during the application of a given number of volume units applied to said pipeline.

15. A method as in claim 12 including the step of
   providing an alarm when the difference between said first and second pulses after the algebraic summation of said error factor exceeds a predetermined value.

16. A method of determining an error factor for a pipeline monitoring system including input meter means for measuring the volume units applied to the pipeline and providing first pulses representative thereof and second meter means for measuring the volume units of fluid removed from the pipeline and providing second signals representative thereof, comprising the steps of
   applying said first and second pulses to inputs of bidirectional counter means,
   enabling predetermining counter means to count said first pulses upon a first predetermined change in state of said bidirectional counter means,
   disabling said predetermining counter means upon a successive second predetermined change of state of said bidirectional counter means, and
   sensing the contents of said predetermining counter means totaled between said first and second changes of state of said bidirectional counter means for use as said error factor.

17. A method as in claim 16 for determining a combined factor for said second meter means wherein the combined factor for said input meter means is known, comprising the steps of
   totaling said first pulses and totaling said second pulses, and deriving a correction factor by dividing one total by the other, and
   multiplying said correction factor by said combined factor for said input meter means to obtain a combined factor for said second meter means.

18. A method for use in a pipeline monitoring system, including first meter means for measuring the volume units applied to the pipeline and providing first pulses representabive thereof and second meter means for measuring the volume units removed from the pipeline and providing second signals representative thereof, of obtaining a combined meter factor for said second meter means comprising the steps of
   totaling a predetermined number of said second pulses, and totaling said first pulses during totaling of said second pulses,
   dividing said first total by said second total, and
   multiplying the result of said division by the combined factor for said first meter means to obtain a combined meter factor for said second meter means.

* * * * *